No. 894,342.

PATENTED JULY 28, 1908.

E. PECKHAM.
CAR TRUCK.
APPLICATION FILED NOV. 10, 1906.

2 SHEETS—SHEET 1.

WITNESSES;

INVENTOR;
Edgar Peckham

No. 894,342. PATENTED JULY 28, 1908.
E. PECKHAM.
CAR TRUCK.
APPLICATION FILED NOV. 10, 1906.
2 SHEETS—SHEET 2.
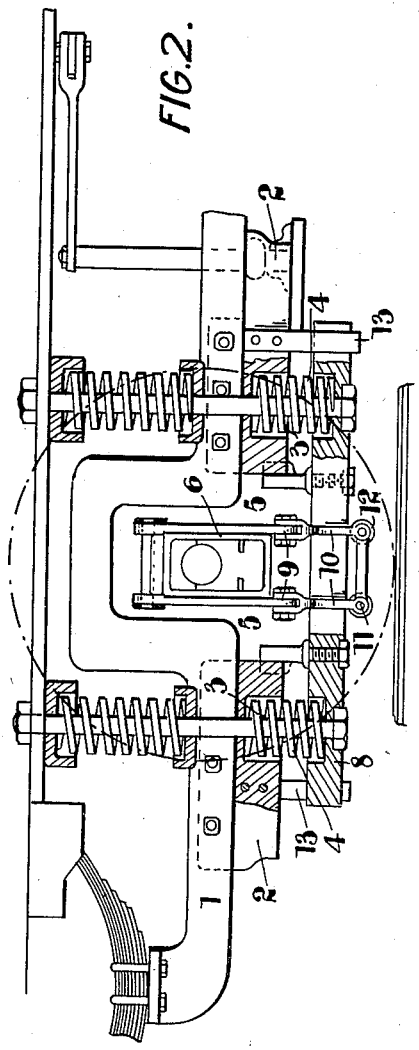
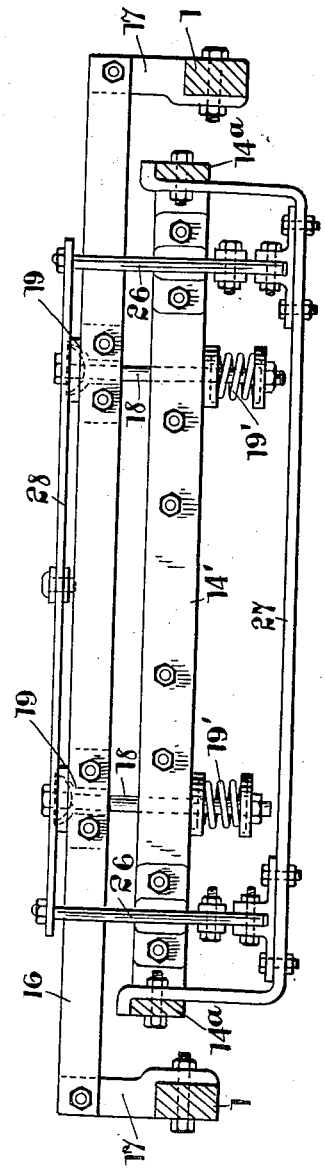
WITNESSES;
INVENTOR
Edgar Peckham

UNITED STATES PATENT OFFICE.

EDGAR PECKHAM, OF LONDON, ENGLAND, ASSIGNOR TO MARY J. PECKHAM, OF LONDON, ENGLAND.

CAR-TRUCK.

No. 894,342.  Specification of Letters Patent.  Patented July 28, 1908.

Application filed November 10, 1906. Serial No. 342,791.

*To all whom it may concern:*

Be it known that I, EDGAR PECKHAM, a citizen of the United States, residing at Queen Annes Chambers, Westminster, London, S. W., England, have invented certain new and useful Improvements Relating to Car-Trucks, of which the following is a specification.

My invention relates to new and useful improvements in the structure of trucks for railway, tramway and similar vehicles, and is especially adaptable to self-propelled vehicles particularly if the means of propulsion consists of electric motors.

The invention embodies improvements relating to the truck and the suspension of the truck, and the invention also includes an improvement in the means for suspending the motors and in the support and arrangement of the brake mechanism.

The present invention relates particularly to a type of car truck or vehicle under-carriage having a flexible wheel base and an axle frame carrying the motor and wheel brakes. This frame or sub-truck is pivoted to the main truck or vehicle in a manner to allow the said frame and its axle to turn independently of the vehicle or main truck in an arc shaped path described from the aforesaid pivotal point.

The object of this invention is to introduce improvements in the method of suspending the main truck from the journal boxes; in the connection and suspension of the sub-truck; in the arrangement of the brakes and operating mechanism; and also structural features, all of which will be hereinafter described.

Figure 1:
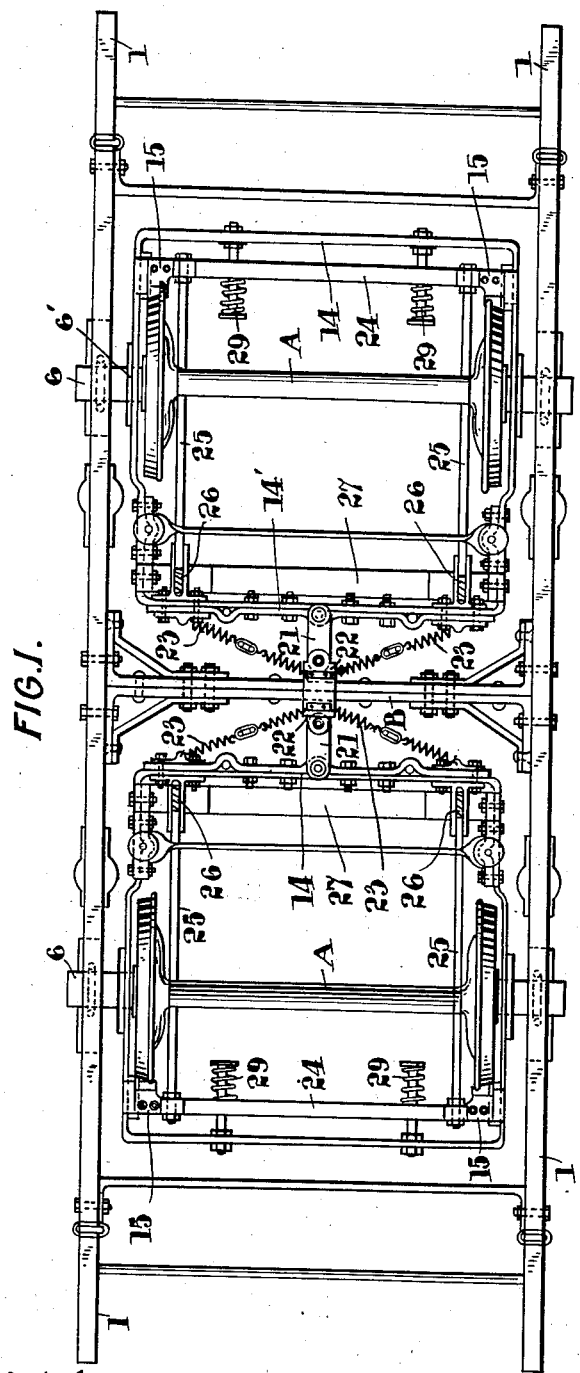
Figure 4:
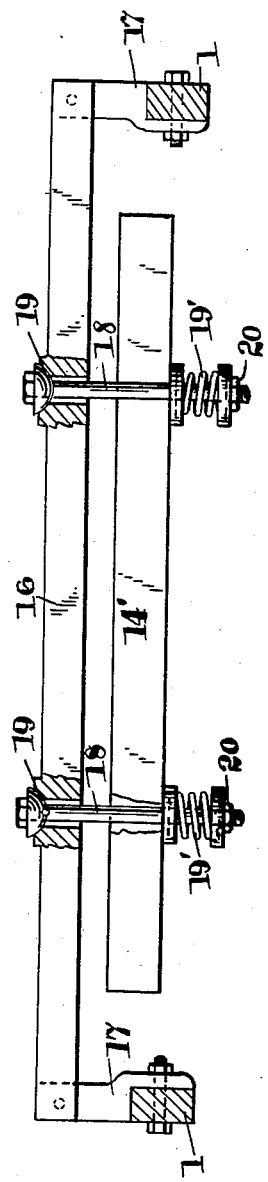

In order that a clear understanding of my invention may be had, reference is made to the accompanying drawings of which, Figure 1 is a plan view of a single car truck or vehicle under-carriage showing the arrangement of the sub-truck structures for supporting the motors and wheel brakes; Fig. 2 is a side elevation of portion of a truck showing a method of suspending the truck from the axle journal-box and also the connection of the brake rigging; Fig. 3 is an end elevation showing the brake rigging connection to the sub-truck and also the means for supporting the sub-truck from the main truck; and, Fig. 4 is a detail view showing separately the pendulum-like support for the sub-truck.

Firstly the invention relates to the main truck structure and consists of a reinforced side frame member 1 constructed of a forged top member and a lower sectional member 2 preferably cast and provided with pockets or recesses 3 to receive the car supporting springs 4. The sections of the lower member are secured to the upper member, a space being left between the ends of the several sections to allow a clearance space 5 for the axle journal-boxes 6. The sections of the lower member are preferably provided with an upper projection which projects upward between the bars of the top member, where two bars constitute the top member, or at the side if only one bar is used. The sectional or lower members are intended principally to be employed for the purpose of converting existing truck frame structures into a form to which the other parts of my invention will be applicable. The said intermediate members will also enable a high running car to be altered to a low running one by dispensing with the intermediate pieces entirely or if the extreme is not wanted, members of less height would be used.

Secondly the invention embodies the employment of a gear for supporting the main truck frame 1 upon or from the journal-boxes. The gear consists of a spring-plank 8 located beneath the journal-boxes and supported therefrom by a U-shaped bolt or by links 9 hanging from the box 6 and extending below it and from which box the spring plank 8 is therefore supported. The spring plank is parallel with the truck frame which is supported by it. The springs 4 are located at each end of the spring plank 8 between it and the truck frame. This arrangement of spring plank supported from the journal-box by a bolt or links will allow the journal-box to move laterally when sufficient side pressure is applied to the wheel flange. To provide for a radial movement of the journal-box when rounding curves, I preferably construct the lower ends of the bolt or links forked shaped so that they will straddle the spring plank and connect the ends of the forked section 10 that extend below the spring plank by a bolt 11 sufficiently strong to support the entire weight of the truck and car. Upon these bolts I locate a hollow tube or roller 12 or other anti-friction device that bears against the under-side of the spring plank 8. These rollers or other devices allow the journal-box to move easily in either direction when rounding curves. The forked ends of the supporting bolts are made sufficiently wide to allow the rollers or device to move freely on curves, and adjust themselves to the radius of the curve. To prevent displacement of the spring plank 8 out of alinement with the truck side frame member 1, the ends of said plank rest in slings 13 which depend from the member 1 to which they are secured.

Thirdly and chiefly the invention embodies the construction, support and arrangement of an inside sub-truck 14 or axle frame which supports the motors (not shown), brakes 15 and operating mechanism therefor. This sub-truck is supported at or near one end upon an extended end 6' of the journal-boxes 6 or upon separate bearings on the axle A, and its inner end by a suspension support, suspended from the sides of the main truck frame 1 in such a manner that the sub-truck frame 14 and motor can move freely with the wheels and axles when radiating on curves. The means of suspension is preferably a device as illustrated in Fig. 4 of the drawings and consists of providing a rigid cross-bar or beam 16 extending from one side frame member 1 to the other nearly at the center of the main truck and elevated by uprights 17. Bolts 18 having semi-spherical heads which fit in corresponding recesses 19 furnish a ball and socket joint for the head of the bolt. The end member 14' is supported by the bolts 18 depending from the cross-bar 16 and as these bolts must support most of the weight of the motor, they must be sufficiently strong. Springs 19' are interposed between the adjusting nuts 20 and the member 14' to provide a cushioning effect for the sub-truck at its point of support. The extreme inner end of the sub-truck is also connected flexibly with the center cross member B of the main truck frame so that the sub-truck can radiate easily from its central connection which it cannot do when this connection is rigid. As the sub-truck has a tendency to move in the same direction as the wheels and axles upon a curve, so that it can adjust itself to curves of different radii the connection as stated is flexible or to a degree universal. A link 21 is pivotally connected at one end to a point at the center of the sub-truck member 14' and at the other end the link is pivoted to a bracket 22 secured on the main cross member B, and to cause the sub-truck to assume a position central with respect to the main truck and car when the car is running on a straight track the inside end of the frame member 14' is connected by spiral springs 23 or their equivalent that are in turn connected to the cross bar B or with an equalizing bar attached at its center to a king pin on the said cross bar B. The springs 23 contract and expand according to the pull on them by the wheels and axles when on curves and tend to return the sub-truck to its normal position central with the car.

Fourthly the invention embodies a brake mechanism construction and arrangement which consists of a main brake beam 24 to which the brake-shoes 15 are attached in the usual way and brake rods and levers connecting the brake beam with a sway bar connected to the car-body. The brake beam 24 is suspended from the outer cross bar or section of the sub-truck frame 14 and is connected at each end by rods 25 to upright levers 26 fulcrumed on a lower cross bar 27 secured to the side frames 14ª of the sub-truck 14 (see Fig. 3). These upright levers (one on each side) are connected to each other by a cross bar 28. This cross bar is connected at its center with the forked end of a brake rod connecting the cross bar with the sway bar attached to the car-body in the usual manner. This sway bar is also connected in the usual manner with rods leading to the platform of the car where the brake is operated. As the brake beam 24 supporting the brake shoes 15 and also the upright levers 26 are connected to the sub-truck they move radially with it and the connections between the upright levers and the sway bar of the car-body being adjustable they are not affected by the radial movement of the sub-truck. Spring devices 29 serve to throw the brakes back to their normal position out of contact with the wheels.

The main truck frame is constructed in the usual manner with enlarged openings in the pedestal sections to allow the journal boxes to move radially without coming in contact with the sides of the pedestals. The truck frame is also provided with the main center cross member B uniting the two side frames and forming a base for the sub-truck frame pivotal connection. The truck frame is also provided with cross bars 16 to which the sub-truck is attached by flexibly suspended bolts.

The general arrangement of the radial gear supporting the main truck frame from the journal boxes and the sub-truck supporting the motor and brake mechanism flexibly suspended from the side members of the main truck together with the flexible connection between the brake levers and the sway bar of the car-body allows the wheels and axles and the sub-truck carrying the motor and brake mechanism to adjust themselves to curves of any radius without interfering with the drive of the motors or action of the brakes. The wheels and axles can also move laterally when side pressure is unequally applied to the wheel flanges as is the case when rounding curves where the outer rail is raised above the level of the inner rail.

What I claim as new and desire to secure by Letters Patent of the United States is:—

1. A railway car or vehicle having a main truck frame which is supported upon or from the car axle in such a manner that the said axle is allowed a radial and also a lateral movement independent of the said truck frame or the vehicle, and a sub-truck or structure carrying the propelling motor or motors and the wheel brakes supported on the car-axle and connected at one end to the said main truck in a manner to permit the said sub-truck to move both radially and laterally relatively to the main truck with the movement of the axle, substantially as described.

2. In combination with the main truck of a vehicle, a sub-truck structure carrying the motor or motors and the wheel brakes, the said sub-truck being sleeved or supported on an axle of the vehicle and flexibly connected at one end to the main truck to permit of a radial movement and also a lateral movement independent of said main truck, and springs or like means for centralizing the sub-truck when the vehicle is running on a straight track, substantially as described.

3. In combination with an under-carriage or main truck of a car or vehicle, wheel brakes and operating mechanism therefor connected to and suspended from a sub-truck or axle frame so as to permit a free radial movement and also a lateral movement of said truck, and an arrangement of links and levers for operatively connecting said brakes with the operating mechanism.

4. In combination with a truck structure or under-carriage for cars or other vehicles consisting of a main truck and a sub-truck having independent movement relatively to the main truck, means for supporting said main truck from the car-axle journal boxes in a manner to permit vertical movement of the main truck and also independent radial and lateral movements of the axle independent of the truck or vehicle, substantially as described.

5. A radial sub-truck or structure for supporting the propelling motor and brakes of railway or tramway vehicles connected to and suspended from the main truck or the vehicle in a manner that will permit the said sub-truck to move both laterally and radially with the wheels and axles to adjust itself to different curves of the track, substantially as shown and described.

6. In a car or vehicle truck or under-carriage the employment of intermediate separable sections or extensions to the truck frame between the truck suspension gear and the truck frame, substantially as and for the purpose set forth.

7. In a vehicle of the class described, the combination with the wheels and axles, of axle boxes upon said axles, a truck structure for the under-carriage of said vehicle including spring planks, and links for suspending said spring planks from the axle boxes, said links permitting free lateral movements of the spring plank with respect to the axle boxes, said spring planks resting upon the link suspension in such manner as to have longitudinal movements with respect thereto, whereby said truck may move radially and laterally independently of the axles.

8. The combination with the truck structure or under-carriage for cars or similar vehicles, of wheels and axles therefor, axle boxes upon said axles, and a link suspension provided for supporting said truck from the axle boxes, said truck having a sliding movement with respect to said link suspension.

In witness whereof I have hereunto set my hand this 24th day of October 1906.

EDGAR PECKHAM.

Witnesses:
ARNOLD J. TANNER,
ERNALD SIMPSON MOSELEY.